Dec. 2, 1958    J. DELISO    2,862,746
SOCKET AND ROD COUPLING
Filed July 20, 1956    2 Sheets-Sheet 1
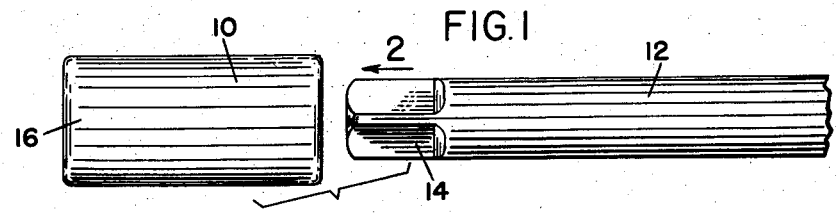
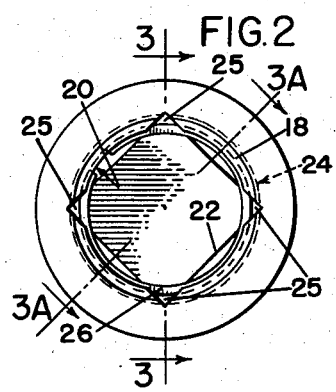 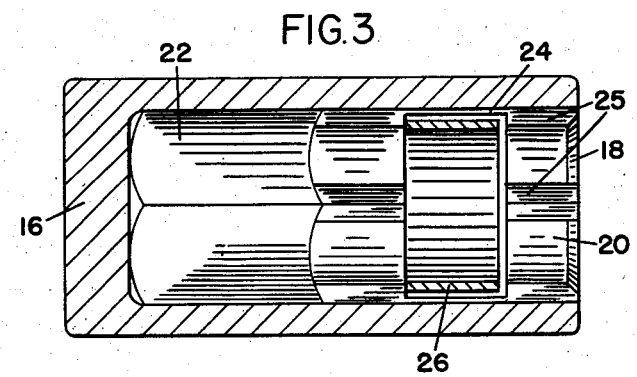
   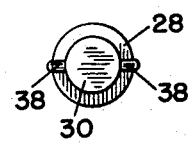
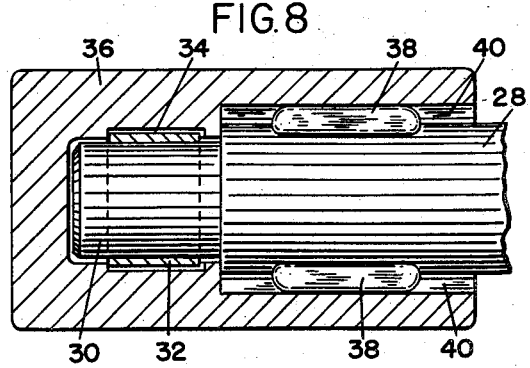 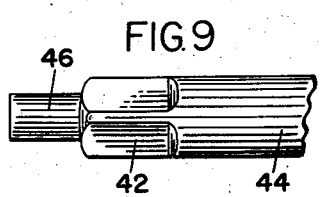
INVENTOR
JOHN DELISO
ATTORNEY Dec. 2, 1958                 J. DELISO                 2,862,746

SOCKET AND ROD COUPLING

Filed July 20, 1956                                2 Sheets-Sheet 2

INVENTOR
JOHN DELISO

ATTORNEY

United States Patent Office 2,862,746
Patented Dec. 2, 1958

2,862,746

SOCKET AND ROD COUPLING

John Deliso, Worcester, Mass.

Application July 20, 1956, Serial No. 599,224

3 Claims. (Cl. 287—126)

This invention relates to a new and improved coupling particularly adapted for releasably securing a rod to a socket, whether the socket be used as a wrench, as a rod extension, or as a thimble in a handle for interchangeable tools, or in any other form or relationship desired; however, the principal object of the present invention includes the provision of the new and improved coupling principally for use in a socket wrench, the construction being such as to avoid the use of the conventional spring-pressed ball or detent.

Other objects of the invention include the provision of a coupling comprising a socket which may be in the form of a hollow thimble closed at one end and open at the other end, said thimble having a portion of the interior thereof in cylindrical form, said cylindrical portion including an internal groove which may be annular, and which holds an annular resilient retaining spring strip therein, the spring strip extending into the bore of the cylindrical portion to frictionally receive and yieldably hold a rod conforming in shape generally to the shape of the bore in the thimble, and said thimble being also provided with a non-circular portion cooperating with a similarly shaped non-circular portion on the rod which is held by the spring strip whereby the socket may drive the rod, or vice-versa, without the liability of accidental removal of the rod from the socket, but at the same time the parts are quickly and easily detachable due to the nature of the frictional retention of the rod by the spring strip.

Other objects and advantages of the invention will appear hereinafter.

Reference is to be had to the accompanying drawings, in which

Fig. 1 is a view illustrating one form of socket and rod connection;

Fig. 2 is an end view of the socket on a greatly enlarged scale;

Fig. 3 is an enlarged sectional view, taken generally on the line 3—3 of Fig. 2;

Figs. 4, 5, 6 and 7 are end views of the rod illustrating various shape of driving surfaces that may be utilized in this invention;

Fig. 8 is a sectional view showing a modification;

Fig. 9 is a view in elevation illustrating a modified form of rod; and

Figure 3A:
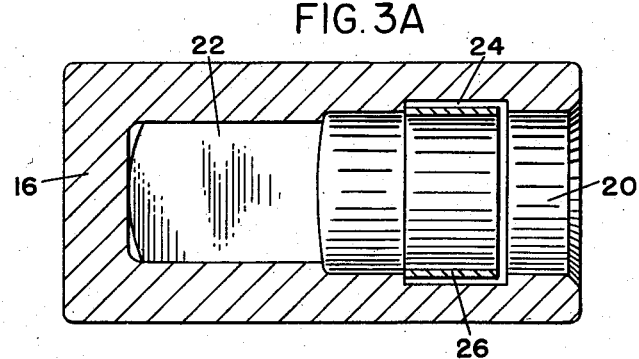
Fig. 3a is a section on line 3A—3A of Fig. 2.

In Fig. 1 there is shown a socket member 10 and a rod member 12. The socket member 10 is illustrated as a cylindrical thimble and the rod member 12 is shown as cylindrical throughout the major portion of its length but having a square end 14 which is adapted to be received within the thimble 10 to be held therein, whereby the rod may rotate the socket or vice-versa. The socket 10 may be knurled or plain, and it may be in the form of a socket for a socket wrench or it may be used in a ratchet wrench or as a shank holder in a handle for a set of tools, each one of which is separately attachable and detachable with respect to the handle.

The construction of the socket 10 is best shown in Figs. 2 and 3, and it will be seen that this socket comprises the generally cylindrical thimble which is hollow. This thimble is closed at one end as at 16 and is open at the opposite end as at 18. Starting at one end 18, the thimble is provided with a generally cylindrical bore 20 which extends inwardly a convenient distance and then terminates adjacent the closed end 16 in a square socket indicated at 22.

Intermediate the ends of the cylindrical portion of the bore, there is provided an internal annular groove 24 in which is received and held an annular spring 26. This spring is held in the groove because its normal exterior diameter is greater than the diameter of the bore. On the other hand, its interior dimension is less than the diameter of the bore and this is clearly illustrated in Figs. 2 and 3, wherein it is clear that the spring strip 26 although held in the groove against extraction extends into the bore for the purpose of yieldably frictionally gripping the cylindrical portion 12 of the rod of Fig. 1.

The spring 26 may be a split metal ring of proper tension, or it may be an annular rubber member or made of nylon or the like. In any event, the function of this spring strip is for the purpose of annularly grasping or gripping the rod as above described when the same is thrust into the bore of the thimble 10. Small longitudinal grooves 25 coincide with the corners of the square portion 22 and act to guide the corners of portion 14 into seating relation in the socket.

When the rod is thrust into the bore, the square end 14 thereof will seat in the square socket 22, thus providing four driving faces for solidly driving one member by the other without any danger of slippage or camming action, etc. By this means, a completely positive rotative drive is assured while the spring strip 26 provides against accidental removal of the rod from the socket. On the other hand, the rod is removable from the socket manually merely by pulling it out and overcoming the friction of the spring strip.

Referring now to Figs. 4, 5, 6 and 7, there are here shown respectively a square, an oval, a triangular, and a flanged or wing-type of rod end, any one of which may be utilized to carry out the purposes of the present invention. Many other shapes may likewise be used, but it is believed that the disclosure of Figs. 4 to 7 inclusive serve to illustrate the fact that this invention is not limited to the square socket and rod end shape.

Also, in Fig. 8 there is shown an alternative form of the invention which here has been disclosed as applied to the fin or wing-type of rod as shown in Fig. 7. In this case, the rod is indicated by the reference numeral 28 and it is provided with a reduced end portion 30 which is frictionally held by the annular spring strip 32 located and held in the interior groove 34 in the socket or thimble member 36. The fins 38 slide into and are held non-rotatively relative to the socket or thimble 38 in diametrically opposed longitudinal slots 40. It will be clear that in this case also the fins 38 could be dispensed with and any of the other shapes of driving faces or surfaces may be used instead.

Fig. 9 shows how the rod would appear were the Fig. 8 modification utilized with a square section for driving purposes as at 42, the main portion of the rod being shown at 44 and the reduced end portion at 46. Reduced end portion 46 corresponds to that at 30 in Fig. 8 and is used for the same purpose and in the same manner.

Figure 10:
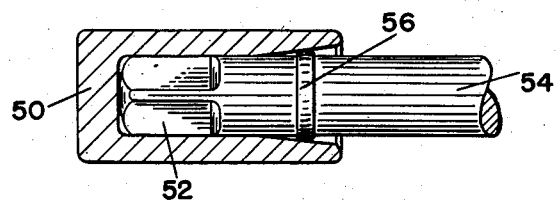
Fig. 10 is a sectional view illustrating a modification.

In Fig. 10 there is shown a modification of the invention wherein the socket is indicated at 50 and is provided with a square section 52 at the interior thereof similar to that at 22. In this case, however, the socket 50 tapers or flares outwardly as shown in Fig. 10 and the rod 54 is provided with a grommet or annular ring 56 or rubbery material or the like which is lightly forced into the tapered portion of the socket and is held thereby frictionally similarly to the holding action of ring 26. The main difference in this modification resides in the fact that the ring or grommet 56 is positioned upon the rod 52 rather than in the socket.

It will be seen that this invention provides a relatively simple and easily operated coupling of the class described and that it does away completely with the conventional spring-pressed detent construction. It will be seen that one of the advantages of the present invention resides in the fact that the rod contains no moving parts whatsoever and therefore it is less expensive to manufacture sets of tools with a single handle and a plurality of removable shanks since the shanks need not be provided with any movable parts such as the conventional spring-pressed ball or detent.

Further, a much more positive drive is presented herein than is possible in the usual spring-gripped shank, and a great deal more force can be applied to the wrench or other tool than in prior art constructions.

Having thus described my invention and the advantages thereof, I do not wish to be limited to the details herein disclosed, otherwise than as set forth in the claims, but what I claim is:

1. A coupling comprising a socket member and a rod to be axially applied thereto and releasably secured therein merely by relatively pushing the parts together and pulling the same apart by straight, easy, manual pressure, said rod having a non-circular rotatively driving portion at its end for entry into the socket member, and a corresponding non-circular rotatively driving portion at the bottom of the socket for reception thereof whereby the rod or socket member is selectively used to rotatively drive the other, and a ring-like resilient gripping member held in the socket and frictionally gripping the rod when the rotatively driving portions are engaged, the normal internal diameter of the ring-like resilient member being slightly smaller than the effective diameter of the rod and the resilient gripping member being substantially circular and located in the socket to grip the rod at a point spaced from the rotatively driving portion thereof, said socket having a substantially circular portion with an internal groove therein to receive and hold the ring-like resilient member, said groove having a bottom of a diameter greater than the external diameter of the ring-like member, and the circular portion of the socket having an internal diameter less than the internal diameter of the ring-like resilient member.

2. A socket for a wrench comprising a generally hollow thimble closed at one end and open at the other end, a substantially cylindrical portion in the hollow of the thimble, a circular groove in the wall of the cylindrical portion, a resilient retainer ring held against extraction in the groove, said ring being capable of expansion in the groove, a non-circular portion in the bottom of the thimble, said cylindrical and non-circular portions being separate but generally adjacent each other in the thimble, in combination with a rod having a cylindrical portion inwardly of its end fitting the cylindrical portion of the thimble and a non-circular portion at the end of the rod fitting the non-circular portion at the bottom of the thimble, the retainer ring being of a size to releasingly frictionally grip the rod at the cylindrical portion thereof when the said non-circular portions are mutually engaged, so that the rod and thimble are rotatively drivable one by the other without liability of accidental separation of the rod and thimble, but on the other hand, the rod and thimble are not only easily secured together merely by thrusting the rod in the thimble, but also the rod is easily extracted therefrom by manually pulling the rod and thimble apart the non-circular portions of the rod and thimble comprising flats, said flats forming straight-line corners extending longitudinally of the rod and thimble at the junctures of the flats, said corners being located on a circle the diameter of which is slightly greater than the internal diameter of the thimble at the cylindrical portion thereof, and longitudinal grooves in the cylindrical portion of the thimble to slidingly receive the corners as the non-circular portion of the rod is thrust through the cylindrical portion of the thimble.

3. A socket for a wrench comprising a generally hollow thimble closed at one end and open at the other end, a substantially cylindrical portion in the hollow of the thimble, a circular groove in the wall of the cylindrical portion, a resilient retainer ring held against extraction in the groove, said ring being capable of expansion in the groove, a non-circular portion in the bottom of the thimble, said cylindrical and non-circular portions being separate but generally adjacent each other in the thimble, in combination with a rod having a cylindrical portion inwardly of its end fitting the cylindrical portion of the thimble and a non-circular portion at the end of the rod fitting the non-circular portion at the bottom of the thimble, the retainer ring being of a size to releasingly frictionally grip the rod at the cylindrical portion thereof when the said non-circular portions are mutually engaged, so that the rod and thimble are rotatively drivable one by the other without liability of accidental separation of the rod and thimble, but on the other hand, the rod and thimble are not only easily secured together merely by thrusting the rod in the thimble, but also the rod is easily extracted therefrom by manually pulling the rod and thimble apart, the non-circular portions of the rod and thimble comprising flats, said flats forming straight-line corners extending longitudinally of the rod and thimble at the junctures of the flats, said corners being located on a circle the diameter of which is slightly greater than the internal diameter of the thimble at the cylindrical portion thereof and longitudinal indentations in the cylindrical portion of the thimble to slidingly receive the corners, said indentations being aligned with the corners of the non-circular portion of the thimble.

References Cited in the file of this patent

UNITED STATES PATENTS

| | | |
|---|---|---|
| 858,131 | Aichele | June 25, 1907 |
| 1,028,562 | Fogelman | June 4, 1912 |
| 1,052,077 | McMillan | Feb. 4, 1913 |
| 1,508,026 | Noble | Sept. 9, 1924 |
| 2,105,330 | Pagenkopf | Jan. 11, 1938 |
| 2,312,471 | Low | Mar. 2, 1943 |
| 2,704,681 | Fischer | Mar. 22, 1955 |

FOREIGN PATENTS

| | | |
|---|---|---|
| 21,814 | Sweden | Feb. 13, 1906 |